June 5, 1962  R. L. DOAN  3,037,894
REINFORCED BUILDING BOARD
Filed Sept. 23, 1959  2 Sheets-Sheet 1
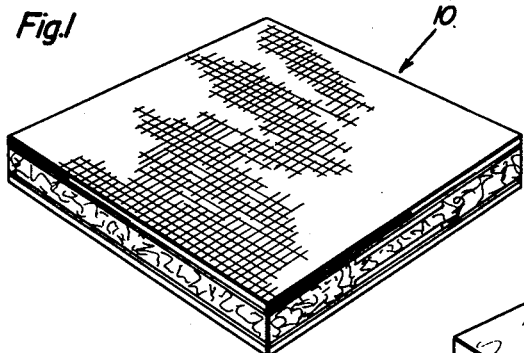
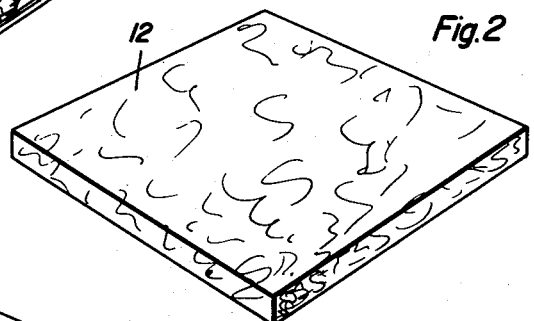
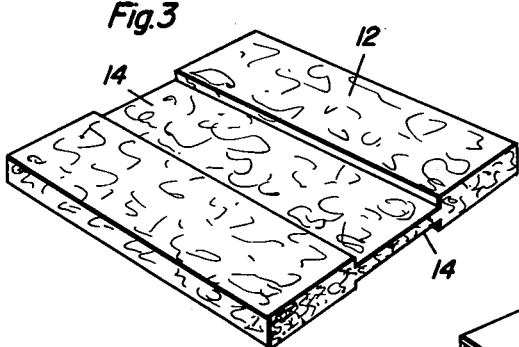
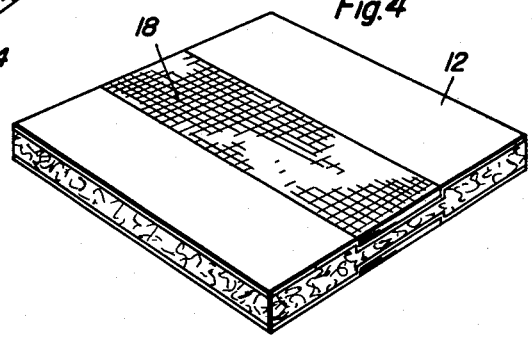
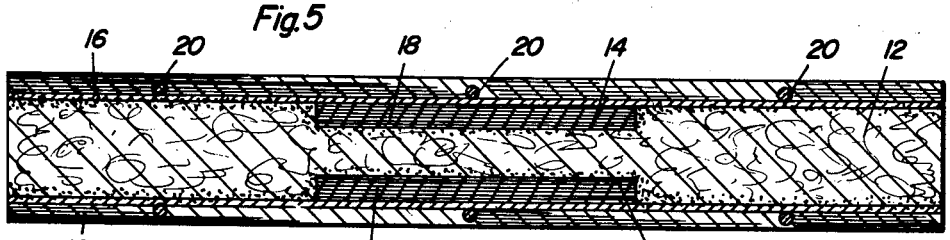
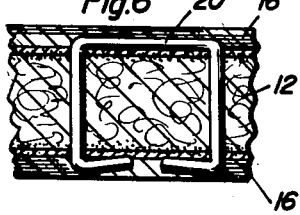
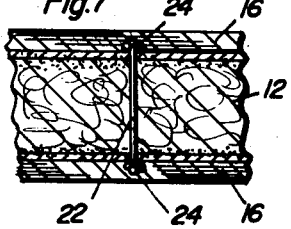
Roscoe L. Doan
INVENTOR.

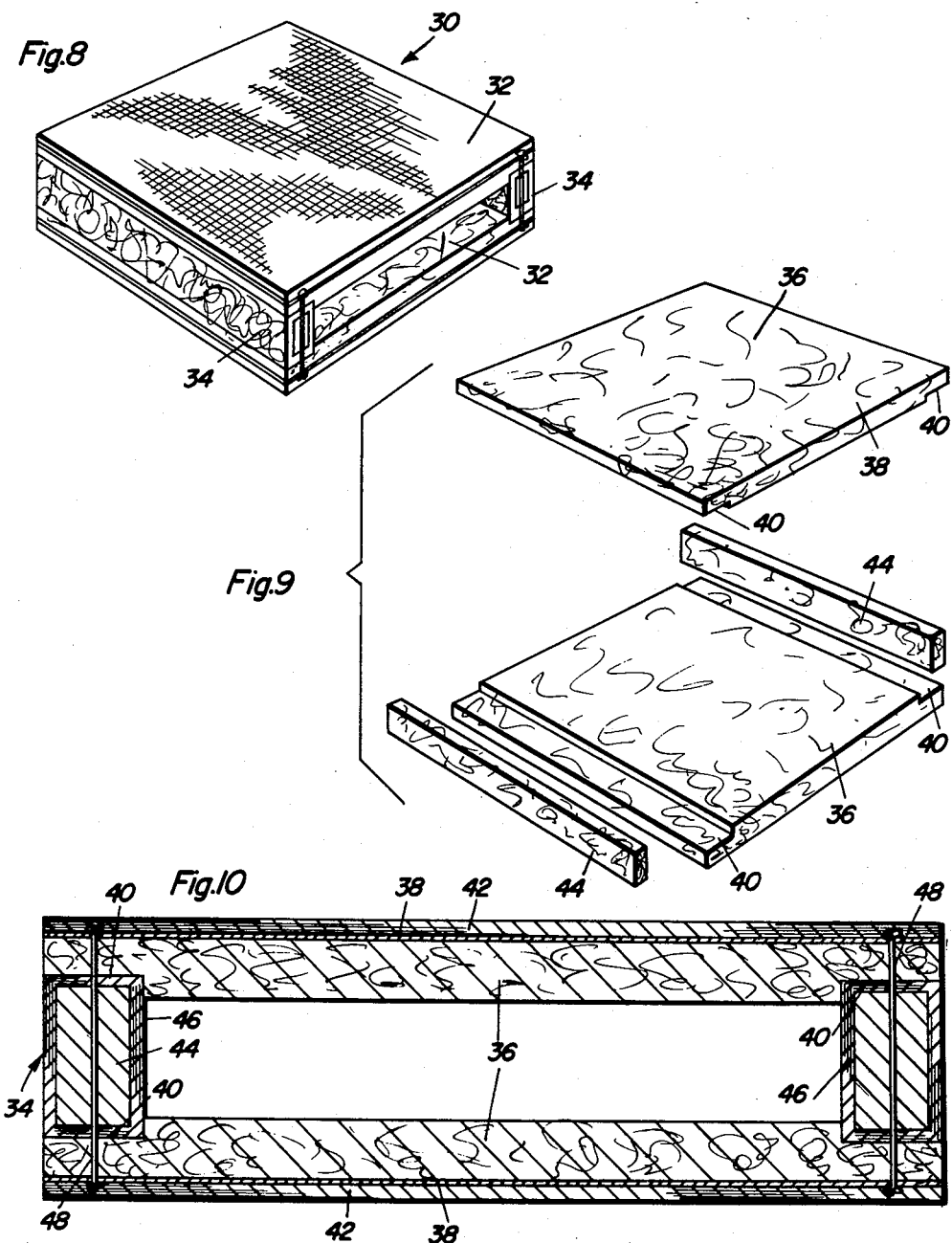

United States Patent Office 3,037,894
Patented June 5, 1962

3,037,894
REINFORCED BUILDING BOARD
Roscoe L. Doan, 700 E. Detroit, Chandler, Ariz.
Filed Sept. 23, 1959, Ser. No. 841,712
3 Claims. (Cl. 154—45.9)

This invention comprises a novel and useful composition waterproof building board and method of making same and more particularly relates to laminated insulation board and a method for producing the same.

The primary object of this invention is to provide a building board of a laminated construction together with a process for producing the same whereby the building board will possess exceedingly high insulating properties as well as structural strength in comparison with its weight.

A further object of the invention is to provide a laminated building board capable of fabrication from readily available and inexpensive materials.

A further object of the invention is to provide a building board of a laminated construction in which additional local rigidity, strength and insulating properties may be readily effected.

A further important object of the invention to be specifically enumerated herein resides in the provision of a process and a method whereby there may be fabricated a laminated building board in which the laminations of the same may be effectively secured together in an improved manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a suitable form of laminated insulating board constructed in accordance with this invention;

FIGURES 2-4 are perspective views showing the successive steps in the formation of the board in FIGURE 1;

FIGURE 5 is a view in vertical transverse section through the board of FIGURE 1 showing its internal construction upon an enlarged scale;

FIGURES 6 and 7 are vertical sectional detail views showing types of mechanical fasteners which may be employed for effecting a stronger bond between the components of the laminated board of FIGURE 1;

FIGURE 8 is a perspective view of a modified form of laminated board of a composite character having greater insulating properties than the board of FIGURE 1;

FIGURE 9 is an exploded perspective view of the component base panels or members forming a part of the board of FIGURE 8; and FIGURE 10 is a view in vertical transverse section taken upon enlarged scale through the board of FIGURE 8 and showing its internal construction and the arrangement of its components.

Referring first to the embodiment of FIGURES 1-7, it will be observed that the laminated or composite insulating building board designated generally by the numeral 10 consists of a core or base panel 12 of any suitable material. A satisfactory and readily available material for this purpose is a fiber composition board such as that formed from sugar cane fibers and well known to the trade as "Celotex." However, other boards may be employed for this purpose where they possess sufficient and suitable characteristics for the purposes of this invention as will appear hereinafter.

The base panel 12 of FIGURE 2 in accordance with the process of forming the laminated insulating board of this invention is preferably provided upon both of its surfaces with a recessed channel as at 14 which extends transversely thereacross. Obviously, a plurality of such channels may be provided if desired. The laminated board is produced by wrapping thereabout or by applying to opposite faces thereof one or more layers of glass fiber cloth, which cloth is impregnated with a suitable polyester resin to give it stiffness and rigidity, to more effectively bond the layers of cloth to each other and to the base panel, as in some instances to improve the insulating value and to fireproof the laminated board. This layer or layers of cloth is indicated by the numeral 16 in FIGURES 5-7.

In forming the board of FIGURES 1 and 5, the surfaces of the base panel 12 including the surfaces of the channels 14 therein are treated with one or more coats of a polyester resin to fill the cores or seal the porous surface of the panel. Thereafter, a glass fiber tape shown at 18 is then disposed in one or more layers in the channels 14, and preferably the tape is wound about the panel to thus lie in a pair of channels on the opposed faces of the panel as suggested in FIGURE 5. With the tape disposed in this manner, the tape is impregnated with a suitable polyester resin for the same purposes as the impregnation of the cover 16. It will be understood that the applying of the tape in the channels will produce a localized stiffening and reinforcing effect and a greater insulating property to the portion of the board to which the same is applied. Consequently, the channels 14 in the tape will be disposed at suitable locations along the board depending upon the specific conditions which are to be encountered by the board.

After the tape has been applied, the same is impregnated with the polyester resin whereupon the cover sheet 16 of glass fiber cloth is then wrapped about or applied to the opposite surfaces of the board and overlies the tape as well as these surfaces. The layer or layers of the glass fiber cloth is then likewise impregnated. It will be observed that the polyster resin will provide a suitable adhesive whereby the layers of fiberglass cloth may be secured to the base panel and to each other and to the tape 18. In some instances, however, a further adhesive agent can be provided at these locations for this purpose.

Still further, as shown in FIGURES 6 and 7, mechanical fastening means can be employed as a substitute for or to augment the adhesive effect previously mentioned. Thus, as shown in FIGURE 6, wire staples or the like as at 20 may be inserted through the base panel 12 and may be embedded in the layers of glass fiber cloth 16 to securely unite these elements together. Alternative, as suggested in FIGURE 7, thread ties as of nylon yarn or strands as at 22 may be disposed in the panel 12 and through the glass fiber cloth sheet 16, being secured as by knots 24 therein which are embedded in the material of the glass fiber cloth layers. In will thus be seen that this mechanical fastening means is unobtrusively disposed in the panel and yet is effective to provide a further secure bonding means for uniting the laminations of the composite panel together.

As so formed, the panel described in connection with FIGURES 1-7 is light in weight, it possesses great rigidity and strength as well as a high insulating value by virtue of its construction. Further, various local portions of the board can be reinforced and increased as to its strength and insulating value by means of the channel and tape construction previously mentioned.

Referring next to FIGURES 8-10 there is disclosed a composite laminated board designated generally by the numeral 30 which incorporates therein the principles of the board of FIGURES 1-7 but is considerably bulkier and possesses a greater strength insulating value. The composite laminated board 30 consists of a pair of spaced parallel walls each designated by the numeral 32 and which are retained in rigid parallel spaced relation with respect to each other by wall or spacer members each designated by the numeral 34. The wall members 34 are disposed between the two wall members 32 and not only serve to rigidly connect the wall members together but maintain them in a rigid assembled relation, but also serve to define and maintain an air chamber or space between the wall members which further increases the insulating value of the board.

It is to be understood that each of the wall members 32 may be of the constructions set forth in connection with FIGURES 1-7. A preferred construction, however is to form the two wall members with a base panel 36, the pair of base panels having smooth outer surfaces as at 38, while the inner surfaces along the marginal edges engaged by the side wall or spacer members 34 are recessed as at 40 to provide a seat and shoulder in which are received the spacer members or side walls 34.

In this embodiment preferably the outer surfaces 38 of the base panels 36 are first provided with one or more coats of a polyester resin in order to close and seal the porous outer surface of the panel which may be of the construction and materials previously mentioned in connection with FIGURES 1-7, and provide a bonding agent whereby one or more layers of glass fiber cloth 42 may be applied to, wrapped about and secured to the outer surfaces 38 of the panels 36. The spacer or wall members 34 consist of cores or blocks 44 which are preferably rectangular in cross-section as shown in FIGURE 10 and which likewise may be of the same material as that of the panels. The exterior surfaces of these cores 44 are likewise treated with a polyester resin in order to seal the same and one or more layers of glass fiber cloth as at 46 are then wrapped thereabout, these layers being then likewise impregnated with a polyester resin. Thereafter, the side members 44 or spacers are placed in the recesses 40 provided therefor and by the adhesive action of the polyester resin as previously mentioned or by other adhesive means the spacer members and the two walls of the composite block 30 are rigidly secured together. As in the preceding embodiments, mechanical fasteners as shown at 48 may be provided extending through the panels 36 and the spacer members 34 to rigidly unite these members together, the fasteners being of any of the constructions shown in FIGURES 6 and 7 and being embedded in the glass fiber cloth or layers 42 as previously mentioned.

It will further be understood that the construction shown in FIGURES 1-7 may be used to form one of the walls 32 of the composite block 30. Alternatively, a laminated panel as shown in FIGURES 1-7 may be created with the glass fiber tape 18 omitted, or with the glass fiber cloth 16 and/or the glass fiber tape 14 being applied to one face only of the block.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A composition insulation board comprising a base panel of an insulating fiber composition, sheets of glass fiber cloth secured to both faces of said panel, a polyester resin impregnating said sheets, the faces of said panel have channels extending thereacross, reinforcing tape disposed in said channels, said cloth sheets overlying said tape, said polyester resin impregnating said sheets and tape.

2. The combination of claim 1 wherein said tape encircles said panel and is disposed in said channels on both faces of said panel.

3. The combination of claim 2 including mechanical fasteners embedded in said sheets and extending through said tape and base panel.

References Cited in the file of this patent

UNITED STATES PATENTS

| | | |
|---|---|---|
| 1,345,693 | Pye | July 6, 1920 |
| 1,719,200 | Schumacher | July 2, 1929 |
| 1,956,323 | Gregg | Apr. 24, 1934 |
| 2,605,514 | Eshenaur et al. | Aug. 5, 1952 |
| 2,641,561 | Black | June 9, 1953 |
| 2,731,682 | Evans | Jan. 24, 1956 |